(12) United States Patent
O'Sullivan

(10) Patent No.: US 8,375,648 B1
(45) Date of Patent: Feb. 19, 2013

(54) TELEVISION WALL ACCENT PANEL

(75) Inventor: Michael Patrick O'Sullivan, Lamar, MO (US)

(73) Assignee: Michael Patrick O'Sullivan, Lamar, MO (US)

( * ) Notice: Subject to any disclaimer, the term of this patent is extended or adjusted under 35 U.S.C. 154(b) by 65 days.

(21) Appl. No.: 12/930,290

(22) Filed: Jan. 3, 2011

Related U.S. Application Data

(60) Provisional application No. 61/297,684, filed on Feb. 9, 2010.

(51) Int. Cl.
*E04B 1/343* (2006.01)
(52) U.S. Cl. .............................. 52/71; 40/700; 52/656.1
(58) Field of Classification Search ............ 52/71, 36.1, 52/36.2, 656.1; 312/7.2, 204, 244, 245; 348/800, 348/818, 343, 836, 841, 838, 839, 842; 40/725, 40/727, 514, 798, 700, 779, 610, 612; 345/109, 345/905; 248/444.1, 460, 451, 918; 359/601–612; 361/679.27

See application file for complete search history.

(56) References Cited

U.S. PATENT DOCUMENTS

| | | | | |
|---|---|---|---|---|
| 3,329,770 A * | 7/1967 | Rose | .............................. | 348/818 |
| 3,733,436 A * | 5/1973 | Rose | .............................. | 348/842 |
| 5,997,145 A * | 12/1999 | Mora | ............................. | 359/609 |
| 6,594,144 B1 * | 7/2003 | Miles | ....................... | 361/679.22 |
| 6,966,617 B2 * | 11/2005 | Chen et al. | ..................... | 312/7.2 |
| 7,471,804 B2 * | 12/2008 | Lee | ................ | 381/388 |
| 2004/0150943 A1 * | 8/2004 | Rock | ............................. | 361/681 |
| 2005/0200765 A1 * | 9/2005 | Sanchez | ......................... | 348/818 |
| 2007/0056201 A1 * | 3/2007 | Price et al. | ...................... | 40/725 |
| 2008/0297012 A1 * | 12/2008 | Cooper | ........................... | 312/7.2 |

* cited by examiner

*Primary Examiner* — Brian Glessner
*Assistant Examiner* — Beth Stephan

(57) ABSTRACT

This invention can be styled infinitely different ways, fit nearly every TV on the market, ship efficiently, and is very easy for the consumer to assemble and install. This unique product is deemed a TV Decorative Accent Wall Panel. This panel is designed to hang behind the wall mounted TV; therefore allowing variations in TV sizes without impeding on the function or appearance. There is a hole in the middle to allow the TV to be mounted directly to the wall. The panels are hinged to allow the product to ship and be inventoried folded up which prevents damage, saves storage space, and is ready for the consumer to unfold and hang on the wall.

2 Claims, 3 Drawing Sheets

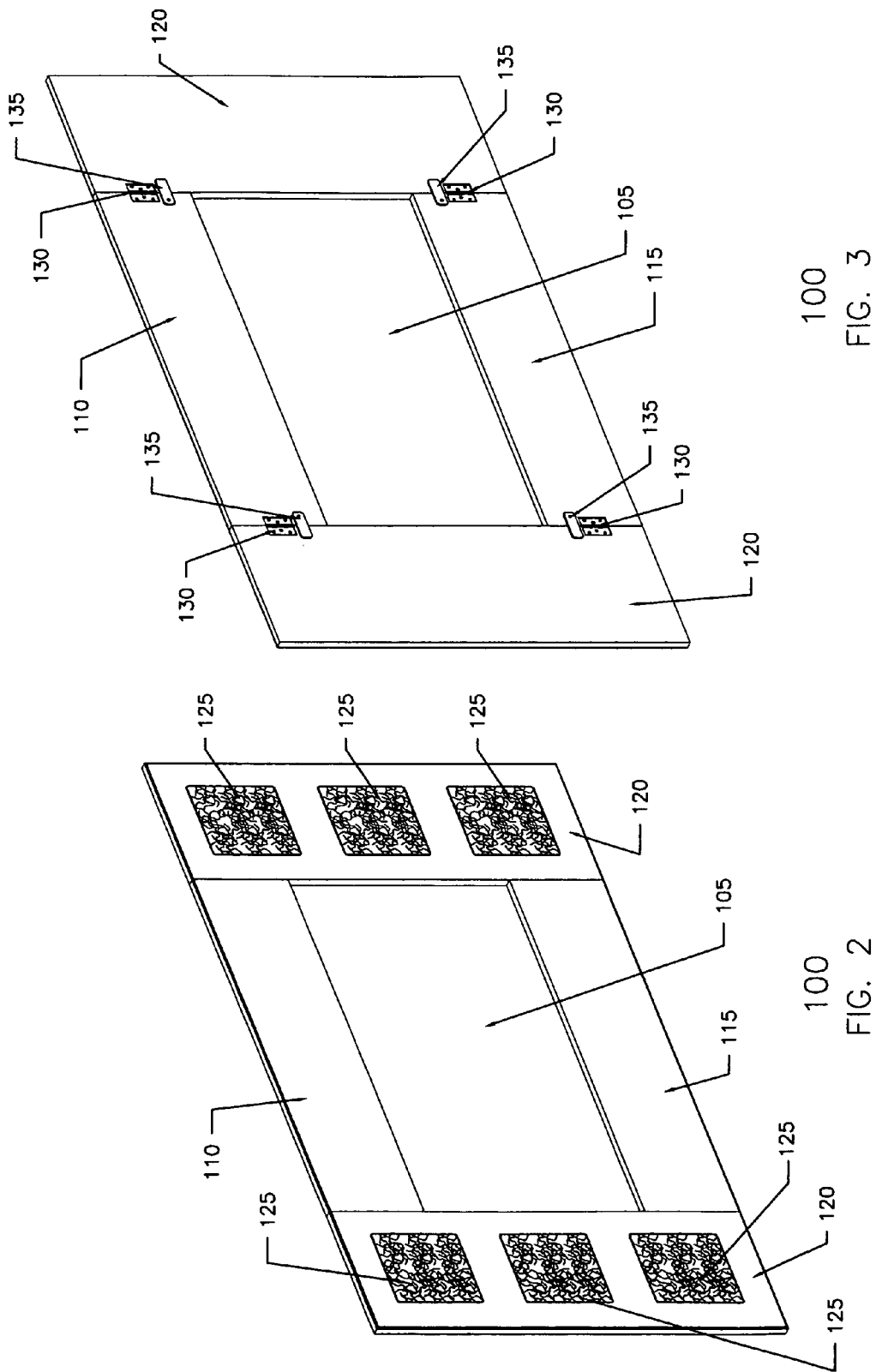

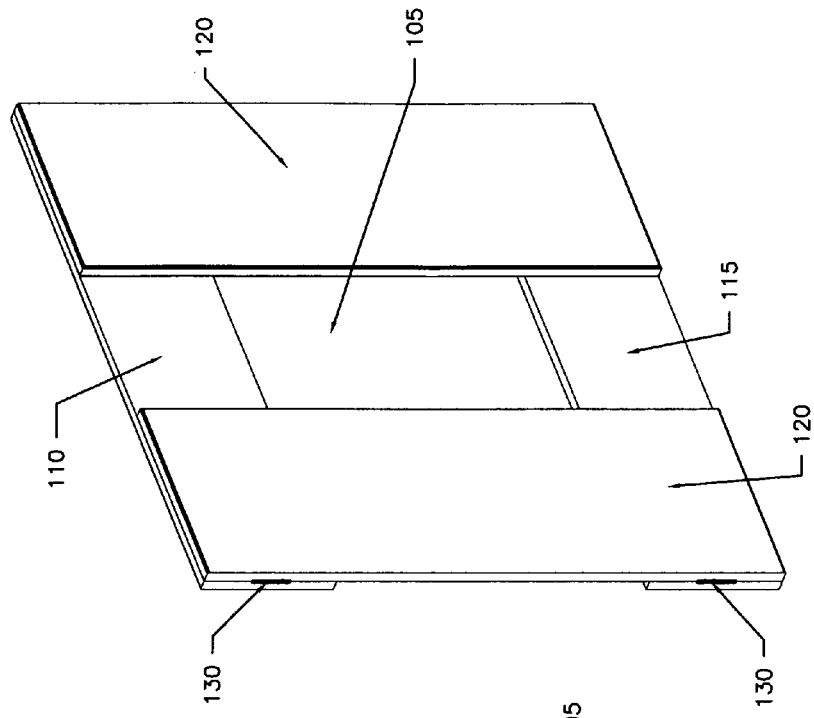
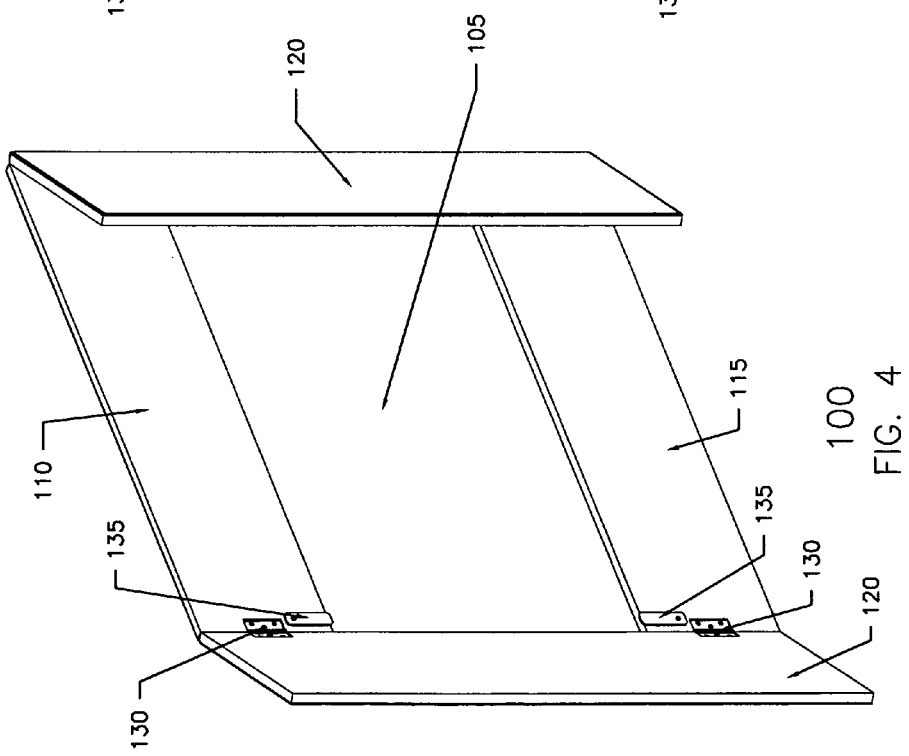

TELEVISION WALL ACCENT PANEL

CROSS REFERENCE TO RELATED APPLICATION

This application claims the benefit of U.S. Provisional Application 61/297,684 filed on Feb. 9, 2010.

BACKGROUND OF INVENTION

The problem/opportunity is how to decorate around a TV with a product that fits most TV manufacturers size variations and ships easily with very little assembly. The TV wall accent panel sits behind the TV to allow for variation in TV brand dimensions, is open in the middle to allow the TV to hang independently, and is shipped as single unit folded up via the installed hinges. This provides a platform for any decorative accent to be included with the product.

BRIEF DESCRIPTION OF THE DRAWINGS

FIG. 2 shows a first side view of the television wall accent panel in accordance with an embodiment of the present invention;

FIG. 3 shows a second side view of the television wall accent panel in an open position in accordance with an embodiment of the present invention;

FIG. 4 shows the second side view of the television wall accent panel in a partially closed position in accordance with an embodiment of the present invention; and FIG. 5 shows the second side view of the television wall accent panel in a fully closed position in accordance with an embodiment of the present invention.

DETAILED DESCRIPTION OF THE INVENTION

Figure 1:
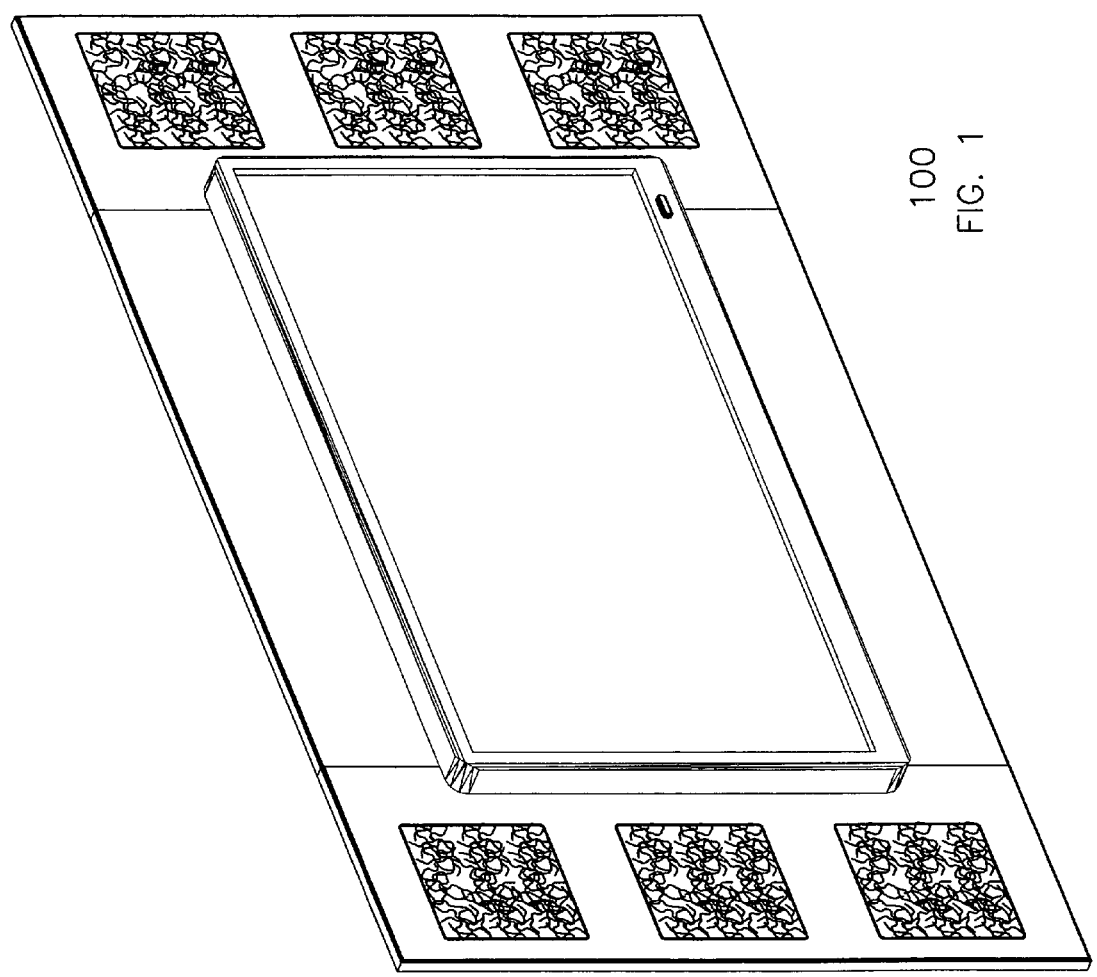
FIG. 1 shows a television wall accent panel with a wall-mounted flat screen television in accordance with an embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention generally provides a ready-to-assemble wall accent for wall-mounted flat screen televisions that provides a decorative and functional backdrop for such televisions within a range of sizes.

FIG. 1 shows a television wall accent panel with a wall-mounted flat screen television in accordance with an embodiment of the present invention. As shown in FIG. 1, the television wall accent panel 100 may comprise a flat panel having decorative details and a cutout space (not shown). The television wall accent panel 100 may be mounted to a wall while the flat screen television may be mounted to the same wall through the cutout space so that the flat screen television sits in front of the television wall accent panel 100.

FIG. 2 shows a first side view of the television wall accent panel in accordance with an embodiment of the present invention. As shown in FIG. 2, the television wall accent panel 100 may comprise a flat panel having a top panel 110, a bottom panel 115, side panels 120, and a cutout space 105. The television wall accent panel 100 may further comprise decorative details 125 on the side panels.

FIG. 3 shows a second side view of the television wall accent panel in an open position in accordance with an embodiment of the present invention. As shown in FIG. 3, the second side of the television wall accent panel 100 may be on the other side of the television wall accent panel 100 from the first side of the television wall accent panel 100. The second side of the television wall accent panel 100 may face the wall when the television wall accent panel 100 is mounted to a wall and may comprise a flat panel having a top panel 110, a bottom panel 115, side panels 120, and a cutout space 105. As shown in FIG. 3, the side panels 120 may be attached to the top panel 110 and the bottom panel 115 via hinges 130, so that the side panels 120 may be folded outwards to open and folded inwards to close. Locking tabs 135 may be rotated outwards so that a portion of the tabs 135 jut over the side panels 120 when the side panels 120 are folded outwards in order to keep the side panels 120 flat, and may be rotated inwards to not jut over the side panels 120 so that the side panels 120 may be folded closed.

FIG. 4 shows the second side view of the television wall accent panel in a partially closed position in accordance with an embodiment of the present invention. As shown in FIG. 4, side panels 120 may be folded inwards via the hinges 130 to a partially closed position.

FIG. 5 shows the second side view of the television wall accent panel in a fully closed position in accordance with an embodiment of the present invention. As shown in FIG. 5, side panels 120 may be folded inwards via the hinges 130 to a fully closed position, such that the side panels 120 are flat against the top panel 110 and the bottom panel 115. By allowing the side panels 120 to be folded inwards to a fully closed position so that they lie flat against the top panel 110 and the bottom panel 115, the television wall accent panel 100 may be shipped flat-packed in a smaller-sized package.

In an exemplary embodiment of the present invention, the television wall accent panel may be made out of metal, wood, fabric, glass, textiles, bamboo, or any other suitable material. The cutout space on the television wall accent panel may be 32 inches wide by 24 inches tall so that it can accommodate televisions having screens from 37 inches to 47 inches diagonal. The cutout space may vary according to the range of television sizes being accommodated.

In an exemplary embodiment of the present invention, the television wall accent panel may be made of metal that may be manufactured and shipped in small pieces that are then joined together using metal joining sleeves that hold the pieces in place with pressure.

In an exemplary embodiment of the present invention, the television wall accent panel may be made of wood that may be manufactured and shipped in small pieces that are then joined together using strips of wood placed on a back side of the panel with tape adhesives.

In an exemplary embodiment of the present invention, the television wall accent panel may be made of bamboo and may be rolled up like a yoga mat yet may still appear stiff when hung in an outer frame.

It should be understood, of course, that the foregoing relates to exemplary embodiments of the invention and that modifications may be made without departing from the spirit and scope of the invention as set forth in the following claims.

We claim:

1. A television wall accent panel system for mounting on a wall between the wall and a television, the system consisting of:

a substantially planar first side wall panel having a top surface and an edge surface, a substantially planar second side wall panel having a top surface and an edge surface, the edge surface of the first side wall panel facing and spaced from the edge surface of the second side wall panel, a substantially planar bottom panel having a top surface and first and second parallel spaced edge surfaces, the first edge surface of the bottom panel abuts the edge surface of the first side wall panel and is hingedly connected thereto, and the second edge surface of the bottom panel abuts the edge surface of the second side wall panel and is hingedly connected thereto, a substantially planar top panel having a top surface and first and second parallel spaced edges surfaces, the first edge surface of the top panel abuts the edge surface of the first side wall panel and is hingedly connected thereto, and the second edge surface of the top panel abuts the edge surface of the second side wall panel and is hingedly connected thereto, the bottom panel and top panel spaced apart from one another defining an opening between the top and bottom panels and the first and second side wall panels, wherein in a first orientation the top surfaces of the panels are in the same plane and the system is placed between the wall and television, and in a second orientation the side wall panels are folded onto the top and bottom panels into a storage position wherein the side panels overlap the top and bottom panels, the opening sized for receiving the television therein for securing the system between the wall and television.

2. The system of claim 1, wherein the panels are hingedly connected via hinges, the hinges further comprise locking tabs for locking the panels.

* * * * *